United States Patent [19]
Oh

[11] Patent Number: 5,664,655
[45] Date of Patent: Sep. 9, 1997

[54] SPLINE

[75] Inventor: Kyung-Ryong Oh, Changwon-Shi, Rep. of Korea

[73] Assignee: Samsung Heavy Industry Co., Ltd., Kyung Nam, Rep. of Korea

[21] Appl. No.: 323,360

[22] Filed: Oct. 14, 1994

[30]   Foreign Application Priority Data

Mar. 31, 1994 [KR] Rep. of Korea .................. 94-6728

[51] Int. Cl.⁶ .................................................. F16D 13/52
[52] U.S. Cl. ................................... 192/70.2; 403/359
[58] Field of Search ...................... 192/70.2, 70.19; 403/359

[56]       References Cited

U.S. PATENT DOCUMENTS 3,621,945  11/1971  Spry ........................... 192/70.2 X
4,838,832  6/1989   Schmitt et al. ................. 403/359
4,989,708  2/1991   Gaggermeier .................. 192/70.2
5,101,951  4/1992   Wiese et al. .................. 192/70.2

*Primary Examiner*—Charles A. Marmor
*Assistant Examiner*—Saul Rodriguez
*Attorney, Agent, or Firm*—Lieberman & Nowak, LLP

[57]           ABSTRACT

Disclosed is an improvement of the spline used for a mechanical apparatus for transmitting/cutting-off power by using friction discs. The spline includes an internal spline in the form of a semi-circular groove and an external spline with both edges thereof having the same arc, at a predetermined length as that of the internal spline.

7 Claims, 6 Drawing Sheets

FIG. 5 (A)
PRIOR ART
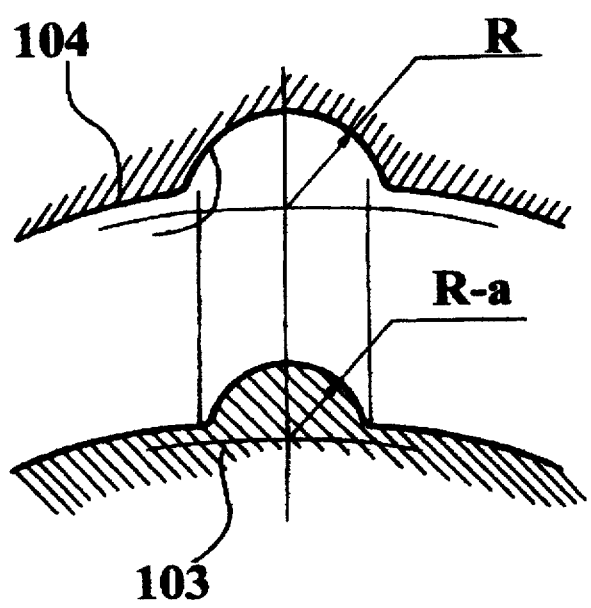
FIG. 5 (B)
PRIOR ART
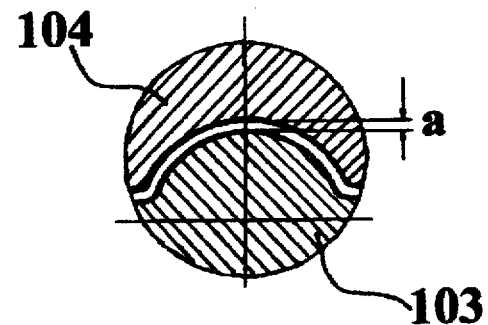
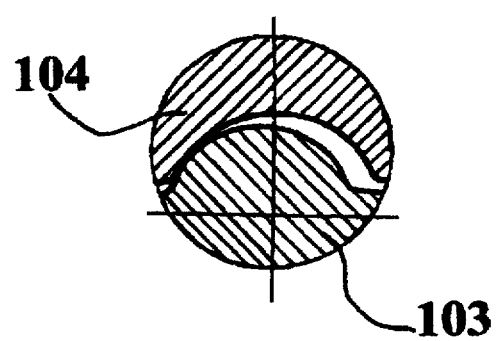
FIG. 5 (C)
PRIOR ART

FIG. 7 (A)
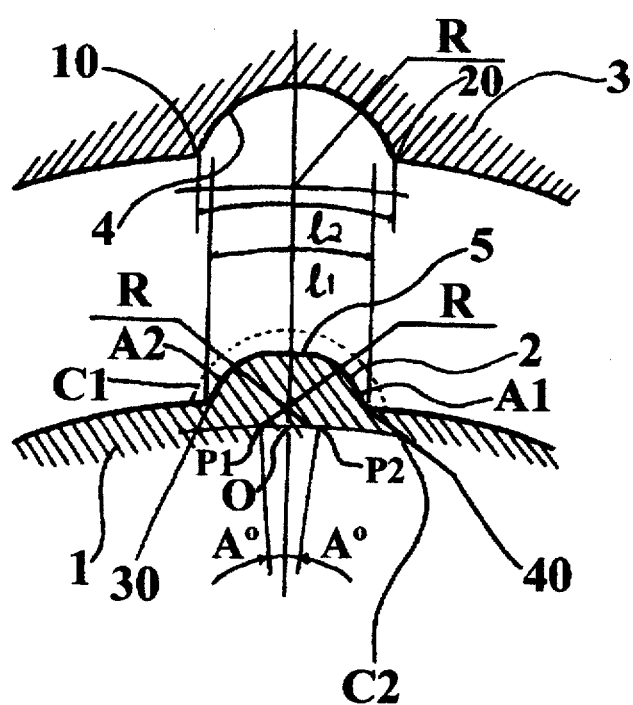
FIG. 7 (B)
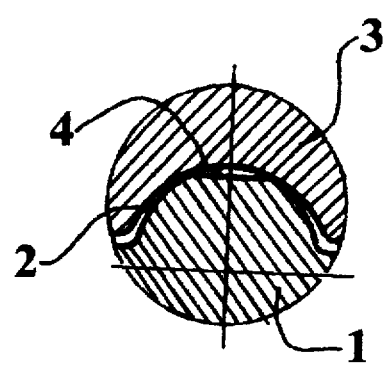
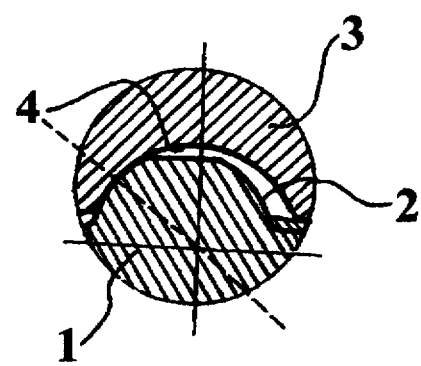
FIG. 7 (C)

SPLINE

BACKGROUND OF THE INVENTION

The present invention generally relates to splines and more particularly to improvements of splines used for a mechanical apparatus for transmitting/cutting-off power by using friction discs, such as a clutch in an automatic transmission for heavy construction equipment.

Similar to keys, splines are used for coupling a shaft with an associated slot in order to transmit power. The spline includes teeth cut on the shaft which correspond to the keys, so that greater torque than that provided by the keys can be transmitted, thus being commonly used for gear changing shafts for machine tools and automobiles.

In general, splines are classified into two types according to its shape; one is a straight sided spline and the other is an involute spline. Further, in specific instances, a rounded spline is also used.

As shown in FIGS. 1 and 2, the straight sided spline has teeth with both edges being straight, and the involute spline has the teeth-shaped sides in an involute curve. In the involute spline, the accuracy of the tooth profile and the pitch can be more readily increased, compared to the straight sided spline. Thus, the turning effect can be smoothly transmitted. When the turning effect acts, the involute spline automatically becomes the concentricity thereof. Further, the strength of the dedendum is high and a notch slot is not necessary at the root portions of the tooth, so that the power transmission capability is high.

Referring to FIG. 3, detailed descriptions will be made for the spline used for the mechanical apparatus for transmitting/cutting-off the power by using friction discs such as the clutch of an automatic transmission.

FIG. 3 shows the clutch of the transmission mentioned above, wherein a plurality of friction plates 103 are installed, at regular intervals, on the external circumferences of a disc carrier 102 connected with a ring gear 101, and a plurality of reaction plates 105 are mounted at regular intervals so as to be radially telescoped with the friction plates 103. The reaction plate 105 is elastically biased with a specific pressure with respect to the housing 104 and is coupled with the friction plate 103 by a moving member 106 which is movable by the supply of pressurized oil, so as to engage the clutch.

Similarly, if the moving member 106 returns to its original position by the elastic force due to the stoppage of the pressurized oil supply, the clearance between the friction plate 103 and the reaction plate 105 gets wider, thus disengaging the clutch. In this method of operation, when the clutch is engaged, the rotation of the ring gear 101 is restricted with respect to the housing 104 by the disc carrier 102, the friction plate 103 and the reaction plate 105; however, when the clutch is disengaged, the ring gear 101 rotates freely.

In the meantime, in the clutch of the automatic transmission, an external spline is formed along with the external circumferences of the friction plate 103 and is engaged with an internal spline formed along with the internal circumferences of the housing 104.

Conventionally, these types of external and internal splines were generally used for the straight sided spline shown in FIGS. 1 and 2 and the involute spline. However, in the straight sided spline and the involute spline case, since a large relative object such as the housing 104 has a fixed spline (i.e., the internal spline) of the friction plate 103, it takes quite a long time to manufacture the spline inside the housing 104 by using a pinion cutter, and the working condition is very poor.

Accordingly, in order to save manufacturing time and reduce the manufacturing cost, the rounded spline, as shown in FIG. 4 has been proposed. In this case, as shown in FIG. 5A, the internal spline formed on the housing 104 is in the form of the semi-circular groove having a radius R, and a corresponding external spline formed on the friction plate 103 is in the form of the semi-circular tubercle having a radius R-a which is smaller than the radius R, so as to guarantee the clearance "a" (see FIGS. 5A and 5B). This clearance is necessary since the friction plate 103 not only makes contact with the spline joint with respect to the housing 104, but also makes a sliding contact with respect to the housing 104 for the engagement/disengagement of the clutch.

However, in such a rounded spline, when the splines are engaged, a point contact is undesirably formed as shown in FIG. 5C. Namely, since the internal spline formed on the housing 104 is in the form of the semi-circular groove having the radius R and the corresponding external spline formed on the friction plate 103 is in the form of the semi-circular tubercle having a radius R-a, the two splines have different arcs, so that the local over-pressure at the point of contact may be concentrated when the splines are engaged.

Furthermore, in cases where the rounded spline is applied for the clutch which performs the speed change function in the power transmission apparatus, since the sliding occurs when the splines are engaged, a fatal defect such as damage to the dedendum may be caused, thus being non-applicable.

The applicant has approached a specific spline form with a low manufacturing cost, which is applicable for the clutch of the power transmission apparatus in which the sliding occurs when the splines are engaged, and which is capable of preventing the local pressure concentration when engaging contact is made.

SUMMARY OF THE INVENTION

It is therefore an object of the present invention to provide a spline having a simple structure and good endurance.

It is another object of the present invention to provide a spline suitable for the clutch of a power transmission apparatus.

According to one aspect of the present invention, a spline including an internal spline and an external spline to be engaged with said internal spline, is featured in that said internal spline is formed in a semi-circular groove having a predetermined radius, said external spline is formed such that both edges thereof have the same arc, at a predetermined length, as that of said internal spline, and a distance between both edges of said external spline is shorter than the distance between both edges of said internal spline.

According to another aspect of the present invention, a spline used for a power transmission apparatus including an external spline formed along with an external circumference of a clutch plate and a corresponding associated internal spline formed along with an internal circumference of a housing, wherein said external spline slides into said internal spline when a clutch is engaged, is featured in that said internal spline is formed in a semi-circular groove having a predetermined radius, said external spline is formed such that both edges thereof have the same arc at a predetermined length as that of said internal spline, and a distance between both edges of said external spline is shorter than the distance between both edges of said internal spline.

Since the spline according to the present invention has the same arc at the contact area as when the internal spline and the external spline are engaged, the contact area increases and thus the undesirable local pressure concentration is prevented.

BRIEF DESCRIPTION OF THE ACCOMPANYING DRAWINGS

For a better understanding of the invention and to show how the same may be carried into effect, reference will now be made, by way of example, to the accompanying diagrammatic drawings, in which:

FIG. 5 is a schematic diagram showing detailed forms of internal and external rounded splines;

FIGS. 5B and 5C is a schematic diagrams showing the status of the splines before and after engagement of the rounded splines of FIG. 5A, respectively;

FIG. 7A is a schematic diagram showing detailed forms of internal and external splines according to the present invention; and FIGS. 7B and 7C are schematic diagrams showing the status of the splines before and after engagement of the splines of FIG. 7A, respectively.

DETAILED DESCRIPTION OF THE PREFERRED EMBODIMENT

Figure 1:
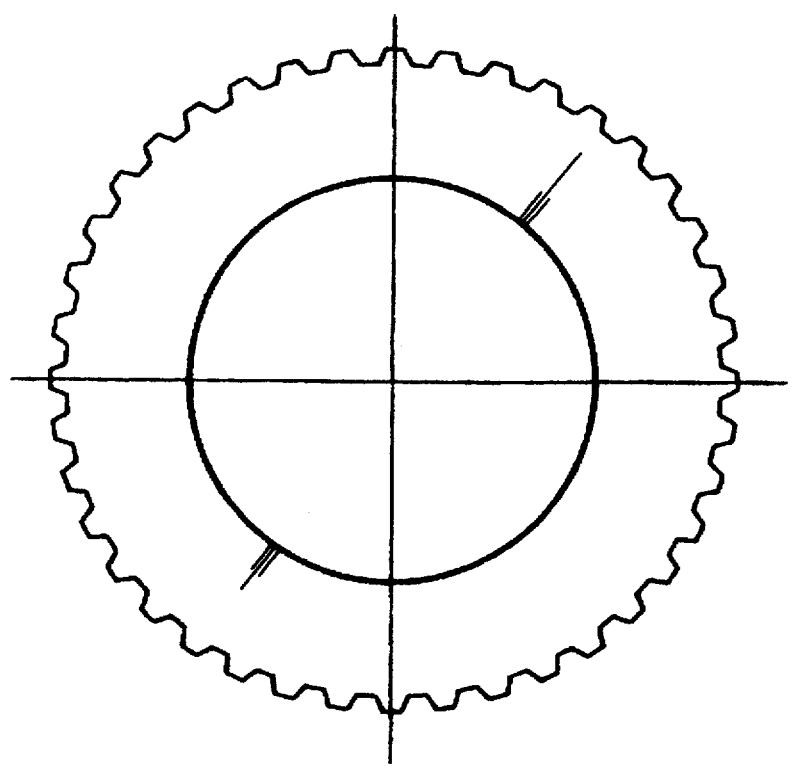
FIG. 1 is a schematic diagram showing a straight sided spline.
Figure 2:
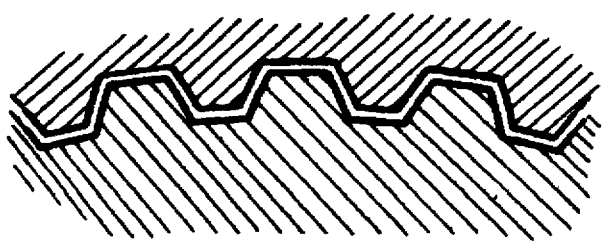
FIG. 2 is a schematic diagram showing a principle part of internal and external straight sided splines.
Figure 3:
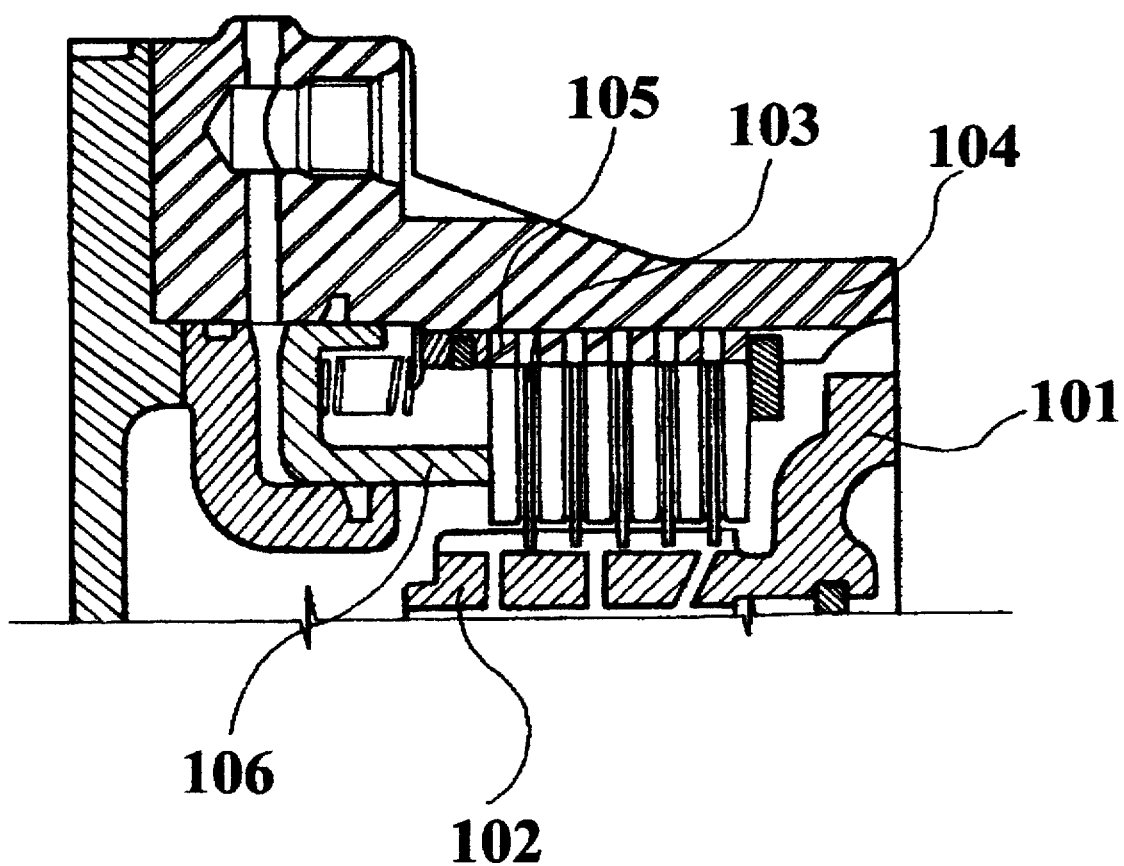
FIG. 3 is a schematic diagram showing the clutch of an automatic transmission.
Figure 4:
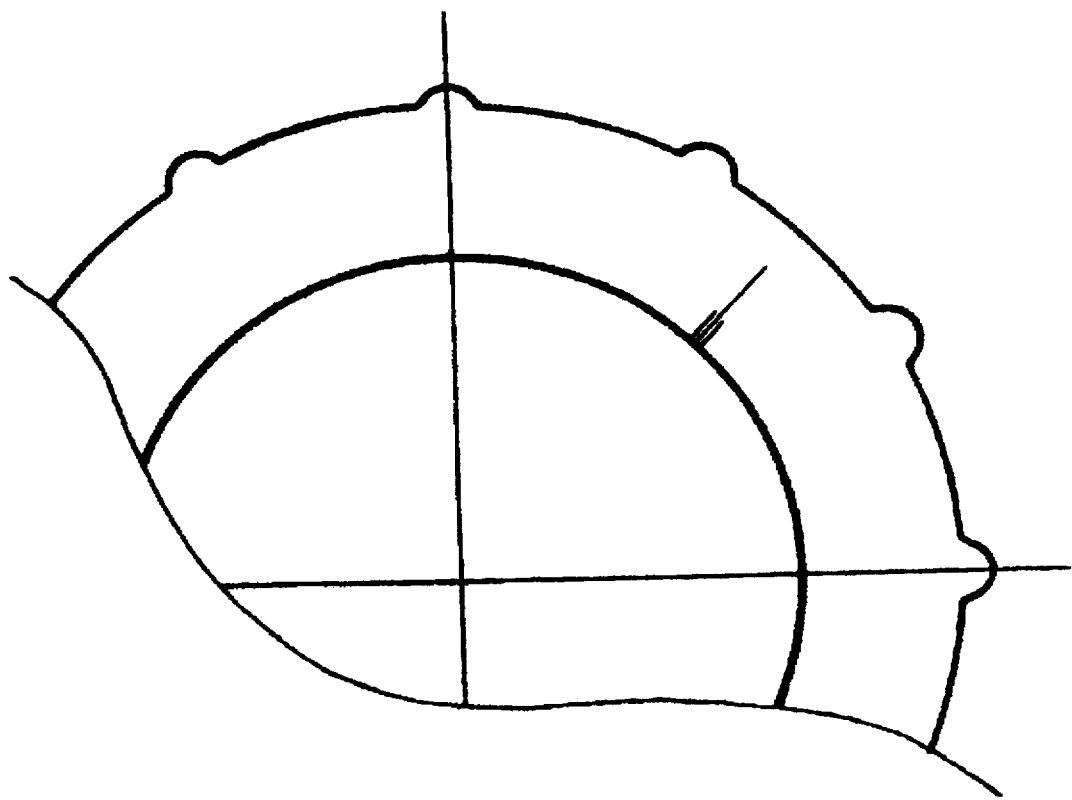
FIG. 4 is a schematic diagram showing a specific part of a rounded spline.
Figure 6:
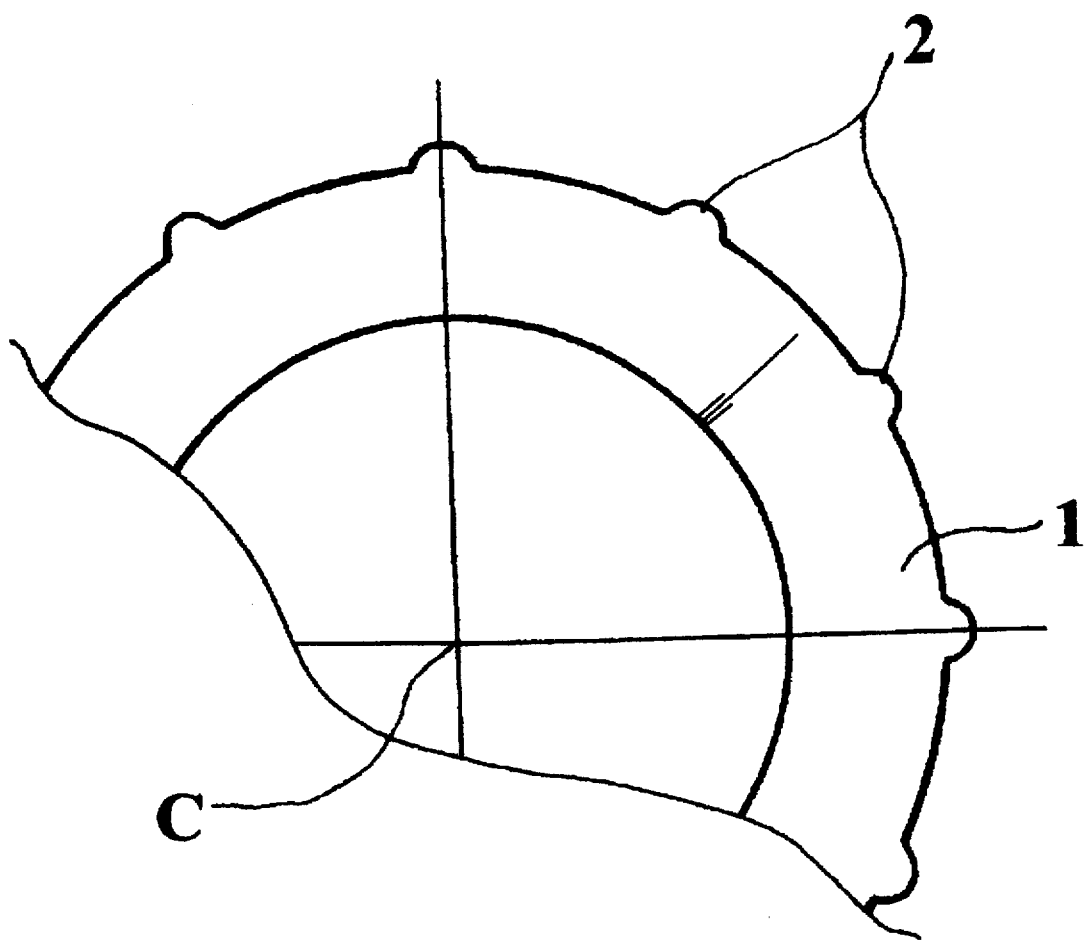
FIG. 6 is a schematic diagram showing a spline according to the present invention.

Referring to FIGS. 6 and 7A, a spline according to the present invention includes an external spline 2 formed along with the external circumferences of a clutch plate 1 and a corresponding internal spline 4 formed along with the internal circumferences of a housing 3.

The internal spline 4 is formed in a semi-circular groove having a radius R a forward edge 10, and a rearward edge 20, and the external spline 2 a forward edge 30 and a rearward edge 40 with having the same arc in the radius R as the internal spline 4. A distance 11 between both edges of the external spline 2 is shorter than the distance 12 between both edges of the internal spline 4, so as to secure clearance.

In more detail, it is assumed that a virtual semicircular tubercle C1 on the clutch plate 1 with the same arc as that of the internal spline 4 has an origin O, and a virtual circle C2 passing through the origin O is drawn from a center point C of the clutch plate 1. Then, two points P1 and P2 are established at positions on the virtual circle C2, where being receded by an angle A° from the origin O, and two arcs A1 and A2 are drawn centered on the points P1 and P2, crossing the radius R. The arcs A1 and A2 become the both side portions of the external spline 2. On the top portion of the external spline 2, a plane portion 5 is formed so as to prevent interference with the internal spline 4 when engaging the splines.

Next, operation of the spline structured as described above will be explained in detail.

When the internal spline 4 and the external spline 2 are disengaged from each other, the clearance 2A° is secured as shown in FIG. 7B. Alternatively, when the splines are engaged, the external spline 2 moves to contact with the internal spline 4 as shown in FIG. 7C. Here, the arc form of the internal spline 4 is the same as the arc forms of the both edges of the external spline 2 contacting with the internal spline 4, so that a contact may be formed through the whole area of the edge sides of the external spline 2. In this way, since the contact area is increased, the local pressure concentration due to the point contact in the conventional apparatus is prevented and the contact pressure is widely spread.

As described above, the spline according to the present invention spreads the contact pressure by the face contact when the splines are engaged, so that the splines are prevented from being damaged and the endurance thereof is improved. Furthermore, since the external spline and the internal spline are formed with the same arcs, the same manufacturing tool (cutting tool) can be used, thus resulting in the reduction of the manufacturing cost. Besides, since the spline form is very simple, the manufacturing cost and the manufacturing time are drastically reduced Although the present invention has been explained for the external spline and the internal spline applied for the clutch plate of the power transmission apparatus and its associated clutch housing, it is a mere exemplary embodiment providing a particular effect of the present invention. One skilled in the art will easily recognize that the present invention may be applied for various mechanical devices without departing from the scope and spirit of the invention, as defined by the appended claims.

What is claimed is:

1. A spline including an internal spline and an external spline to be engaged with said internal spline, wherein the improvement comprises:

said internal spline is formed as a semi-circular groove having a predetermined radius, said semi-circular groove having a forward edge and a rearward edge with a predetermined distance therebetween;

said external spline is formed with a forward and a rearward convex edge, said forward and rearward convex edges having the same predetermined radius as that of said internal spline, with the center point of the forward convex edge and the rearward convex edge being located at different points; and the distance between the forward and rearward convex edges of said external spline being shorter than the predetermined distance between the forward and rearward edges of said internal spline.

2. A spline as claimed in claim 1, wherein a planar portion with a predetermined length is formed on the top portion of said external spline.

3. A spline used for a power transmission apparatus including an external spline formed along with an external circumference of a clutch plate and a corresponding associated internal spline formed along with the internal circumference of a housing, wherein said external spline slides into said internal spline when a clutch is engaged, wherein the improvement comprises:

said internal spline is formed as a semi-circular groove having a predetermined radius, said semi-circular groove having a forward edge and a rearward edge with a predetermined distance therebetween;

said external spline is formed with a forward and a rearward convex edge, said forward and rearward convex edges having the same predetermined radius as that of said internal spline, with the center point of the forward convex edge and the rearward convex edge being located at different points; and the distance between the forward and rearward convex edges of said external spline being shorter than the predetermined distance between the forward and rearward edges of said internal spline.

4. A spline including an internal spline defining a longitudinal axis and an external spline extending from a disk, to be engaged with said internal spline, comprising:

said internal spline being a semicircular concave groove having a predetermined radius and diameter, said semicircular concave groove extending longitudinally with respect to said housing;

said external spline having a forward convex semicircular edge disposed adjacent the periphery of said disk and a rearward convex semicircular edge disposed adjacent the periphery of said disk, said forward and rearward convex semicircular edges having the same radius as that of said internal spline, with the center point of the forward semicircular edge and the rearward semicircular edge being located at different points; and the distance between the forward and rearward semicircular edges of said external spline being shorter than the diameter of the semicircular concave groove of said internal spline.

5. A spline as claimed in claim 4, wherein a planar portion with a predetermined length is disposed between the forward and rearward semicircular edges of said external spline.

6. A spline as claimed in claim 4, wherein the center points of the forward and rearward semicircular edges of said external spline lie on a circle whose center point is the center point of the disk.

7. A spline as claimed in claim 6, wherein the center points of the forward and rearward semicircular edges of said external spline lie on either side of the centerline of the external spline at predetermined angles.

* * * * *